(12) United States Patent
Primativo et al.

(10) Patent No.: US 11,755,859 B2
(45) Date of Patent: Sep. 12, 2023

(54) APPARATUS AND METHOD FOR ENABLING DECODING OF REMOTELY SOURCED AND VISUALLY PRESENTED ENCODED DATA MARKERS

(71) Applicant: Datalogic IP Tech S.R.L., Calderara di Reno (IT)

(72) Inventors: Andrea Primativo, Bologna (IT); Marco Donato Torsello, Vignola (IT); Nicholas Brunetto, Castenaso (IT)

(73) Assignee: DATALOGIC IP TECH S.R.L., Bologna (IT)

( * ) Notice: Subject to any disclaimer, the term of this patent is extended or adjusted under 35 U.S.C. 154(b) by 0 days.

(21) Appl. No.: 17/558,712

(22) Filed: Dec. 22, 2021

(65) Prior Publication Data

US 2023/0196045 A1    Jun. 22, 2023

(51) Int. Cl.
*G06K 7/14* (2006.01)
*G06F 3/04886* (2022.01)
*G09G 3/16* (2006.01)

(52) U.S. Cl.
CPC ....... *G06K 7/1465* (2013.01); *G06F 3/04886* (2013.01); *G09G 3/16* (2013.01); *G09G 2360/18* (2013.01)

(58) Field of Classification Search
CPC ............... G06K 7/1465; G06K 7/1443; G06Q 20/3274; G09G 2360/18; G09G 3/16; G06F 3/04886
See application file for complete search history.

(56) References Cited

U.S. PATENT DOCUMENTS

| | | |
|---|---|---|
| 8,079,522 B2 * | 12/2011 | Harris ............... G06F 16/23 235/462.07 |
| 9,600,724 B2 | 3/2017 | Ko et al. |
| 9,973,705 B2 | 5/2018 | Ko et al. |
| 10,440,279 B2 | 10/2019 | Ko et al. |
| 10,701,272 B2 | 6/2020 | Ko et al. |
| 10,860,854 B2 | 12/2020 | Anorga et al. |
| 10,891,485 B2 | 1/2021 | Anorga et al. |
| 10,893,202 B2 | 1/2021 | Anorga et al. |
| 11,032,478 B2 | 6/2021 | Ko et al. |
| 11,037,150 B2 | 6/2021 | Van Os et al. |
| 11,068,533 B2 | 7/2021 | Amrutkar et al. |
| 11,093,321 B1 * | 8/2021 | Zeavelou ............ G06F 11/0793 |
| 11,300,662 B1 * | 4/2022 | Milton ............... G01S 17/06 |
| 2005/0011957 A1 * | 1/2005 | Attia ................. G06K 7/10722 235/462.46 |

(Continued)

*Primary Examiner* — Daniel I Walsh
(74) *Attorney, Agent, or Firm* — The Juhasz Law Firm

(57) ABSTRACT

A decoding device includes a display, a display buffer to store a current display image of what is currently visually presented on the display, a scanning engine to capture scanning images of objects, and a processor configured to: decode first barcodes carried on surfaces of objects in the scanning images to retrieve first data encoded within the first barcodes; provide the first data to an application routine as input; and in response to a screen capture of the current display image from the display buffer, perform operations including disrupt the decoding of the first barcodes carried on the surfaces of objects of the scanning images, decode a second barcode within the current display image to retrieve second data encoded within the second barcode, and provide the second data to the application routine as input.

20 Claims, 6 Drawing Sheets

(56) References Cited

U.S. PATENT DOCUMENTS

| | | | | |
|---|---|---|---|---|
| 2005/0023357 A1* | 2/2005 | Yeh | G06K 7/10584 | 235/462.43 |
| 2005/0258250 A1* | 11/2005 | Melick | G06K 7/1095 | 235/462.46 |
| 2007/0164117 A1* | 7/2007 | Swiler | B05D 5/06 | 235/494 |
| 2009/0172557 A1* | 7/2009 | Muta | G06F 3/1423 | 715/740 |
| 2011/0155808 A1* | 6/2011 | Santos | G06K 7/146 | 235/462.15 |
| 2011/0210171 A1* | 9/2011 | Brown | H04L 63/083 | 235/382 |
| 2012/0023167 A1* | 1/2012 | Hovdal | G06K 7/1095 | 709/204 |
| 2013/0290234 A1* | 10/2013 | Harris | G06Q 30/00 | 901/50 |
| 2014/0027517 A1* | 1/2014 | Gu | G06K 7/146 | 235/462.41 |
| 2014/0117074 A1* | 5/2014 | Kim | G06K 7/1447 | 235/375 |
| 2014/0263639 A1* | 9/2014 | Bolton | G07C 13/00 | 235/386 |
| 2014/0282954 A1* | 9/2014 | Watanabe | G06Q 30/0226 | 726/6 |
| 2015/0324624 A1* | 11/2015 | Liu | G06V 10/22 | 235/462.11 |
| 2016/0154987 A1* | 6/2016 | Creusot | G06K 7/1443 | 235/462.08 |
| 2016/0342874 A1* | 11/2016 | Powell | G06K 7/10732 | |
| 2017/0061184 A1* | 3/2017 | Wang | G06K 7/10722 | |
| 2017/0293786 A1* | 10/2017 | Taylor | G06Q 10/00 | |
| 2018/0227274 A1* | 8/2018 | Xian | G06K 19/06037 | |
| 2019/0050609 A1* | 2/2019 | Moriyama | G06K 7/10881 | |
| 2019/0138205 A1* | 5/2019 | Wu | G06F 3/04883 | |
| 2020/0092272 A1* | 3/2020 | Eisen | G06Q 20/202 | |
| 2020/0151702 A1* | 5/2020 | Sinha | G06Q 20/3224 | |
| 2021/0174467 A1* | 6/2021 | Hao | G06T 1/20 | |
| 2022/0188940 A1* | 6/2022 | McFarlane | G16H 10/60 | |
| 2022/0330863 A1* | 10/2022 | Sharma | A61B 5/163 | |

* cited by examiner

APPARATUS AND METHOD FOR ENABLING DECODING OF REMOTELY SOURCED AND VISUALLY PRESENTED ENCODED DATA MARKERS

BACKGROUND

1. Technical Field

The present disclosure relates to increasing efficiency and ease of use of machine vision systems.

2. Description of the Related Art

The application of encoded data markings that encode data (e.g., indicia such as barcodes, digital watermarks and/or human-readable text) to a surface of an object for subsequent capture and decoding to retrieve data encoded therein is well known. Also well known is the use of a scanning device incorporating a scanning engine to directly capture an image of such a surface in an effort to capture an image of one or more encoded data markings for decoding. Further well known is the use of such markings, together with such capturing and decoding thereof, in organizing such activities as the transport, storage and inventorying of objects in various industries.

Such a scanning device may be a portable scanning device maintained at a location at which an object bearing one or more of such encoded data markings may be stored, through which such an object may be transported, and/or at which such an object may be offered for sale. By way of example, such a scanning device may be carried by personnel at a warehouse to enable the capture of one or more encoded data markings carried on a surface of an object (e.g., a box, a crate, a palletized load, etc.) as the object is transported into the warehouse, is stored within the portion of the warehouse, is retrieved from such storage and/or is transported out of the warehouse. Also by way of example, such a scanning device may be carried by personnel at a store, a performance venue or other place of business to enable the capture of one or more encoded data markings carried on a surface of an object as the object is transported thereto or therefrom, and/or is presented as part of an admission procedure (e.g., a package of a product that is being purchased thereat, a package that is being delivered or is being picked up by a courier, a ticket that is being presented for admission to attend an event thereat, a ticket that is being presented to board transportation to another location, etc.).

Also known is occasional need to electronically transmit an image of an encoded data marking between electronic devices and/or the users thereof. By way of example, from time to time, events may occur amidst the transportation, stocking and/or selling of objects that carry encoded data markings in which deviations from commonplace procedures may occur. Such events may involve the misidentification, misplacement and/or mislabeling of objects; and/or that may involve the shipment, storage and/or sale of incorrect objects. It is not uncommon for efforts to resolve such a situation to include the electronic transmission of a still image or motion video image of an encoded data marking (e.g., as email attachments and/or through file sharing) to another electronic device carried by another person who is not in the vicinity of the label surface or other surface on which the encoded data marking is carried. As a result, that other person is unable to directly view the encoded data marking, and is unable to use their own electronic device to directly scan the encoded data marking. Although it may seem that being provided with an image of an encoded data marking would be the functional equivalent of having direct access to the encoded data marking, itself, prior art portable electronic devices, including prior art scanning devices, incorporate internal architecture limitations that greatly impede efforts to make effective use of such an image.

In particular, prior art electronic devices that incorporate a scanning engine usually incorporate a set of software components that cooperate to form a decoding pipeline by which an encoded data marking, that is in an image captured by the scanning engine, is decoded to retrieve the data that is encoded therein. Unfortunately, it is common practice to architect the decoding pipeline to extend continuously, without interruption, from the scanning engine to a decoding application that causes a processor to perform the actual decoding of an encoded data marking. The sole purposes of the decoding pipeline is to enable automated and/or manual control of the capturing of images by the scanning engine, and to convey the captured image through layers of interfacing that are defined by the operating system of an electronic device. Over time, as portable electronic devices have benefitted from advances in hardware miniaturization and improving battery technology, the operating systems commonly used in portable electronic devices has changed. Currently, a widely used operating system for portable electronic devices is the Android operating system promulgated largely by Google LLC of Mountain View, Calif., USA, which is based largely on the Linux operating system which was (and continues to be) developed as a collaborative effort among numerous individuals.

In such operating systems, it is common practice to implement such a pipeline to support the scanning and decoding of encoded data markings. In some of such electronic devices, the image of an encoded data marking may also be provided to the graphics system thereof for being visually presented on a display thereof. However, no support is provided for enabling the decoding of encoded data markings that are visually presented on the display, but which are from another source than the scanning engine that is incorporated into the very same electronic device.

As a result, to enable decoding of an encoded data marking that is caused to be visually presented on the display, but which is from a source other than a built-in scanning engine, it has become a commonplace practice (despite also being a cumbersome practice) to cause the image that is currently visually presented on the display to be sent to a printer to generate a hardcopy of that image that can then be scanned by the built-in scanning engine. Thus, a far less cumbersome approach is required.

BRIEF SUMMARY

Technologies are described for making more efficient use of processing resources in identifying and quantifying differing types of barcode read in an automated barcode reading system.

A decoding device includes: a display configured to visually present display images; a display buffer configured to store a current display image that is currently visually presented on the display as display image data; a scanning engine configured to capture scanning images of surfaces of objects; and storage configured to store at least one of the scanning images as captured image data, and an application routine configured to accept data decoded from barcodes as input. The decoding device also includes a processor communicatively coupled to the display buffer and the scanning engine, the processor configured to perform operations including: decode first barcodes carried on the surfaces of objects of the scanning images to retrieve first data encoded within the first barcodes; and provide the first data to the application routine as input. The processor is also configured to, in response to a performance of a screen capture of the current display image from the display buffer, perform operations including: disrupt the decoding of the first barcodes carried on the surfaces of objects of the scanning images; decode a second barcode within the current display image to retrieve second data encoded within the second barcode; and provide the second data to the application routine as input.

A method includes: visually presenting, by a processor of a decoding device, display images on a display of the decoding device; storing a current display image that is currently visually presented on the display as display image data; operating, by the processor, a scanning engine of the decoding device to capture scanning images of surfaces of objects; storing at least one of the scanning images as captured image data, and an application routine configured to accept data decoded from barcodes as input; decoding, by the processor, first barcodes carried on the surfaces of objects of the scanning images to retrieve first data encoded within the first barcodes; and providing the first data to the application routine as input. The method also includes, in response to a performance of a screen capture of the current display image from the display buffer, performing operations including: disrupting the decoding of the first barcodes carried on the surfaces of objects of the scanning images; decoding, by the processor, a second barcode within the current display image to retrieve second data encoded within the second barcode; and providing the second data to the application routine as input.

DETAILED DESCRIPTION

Figure 1:
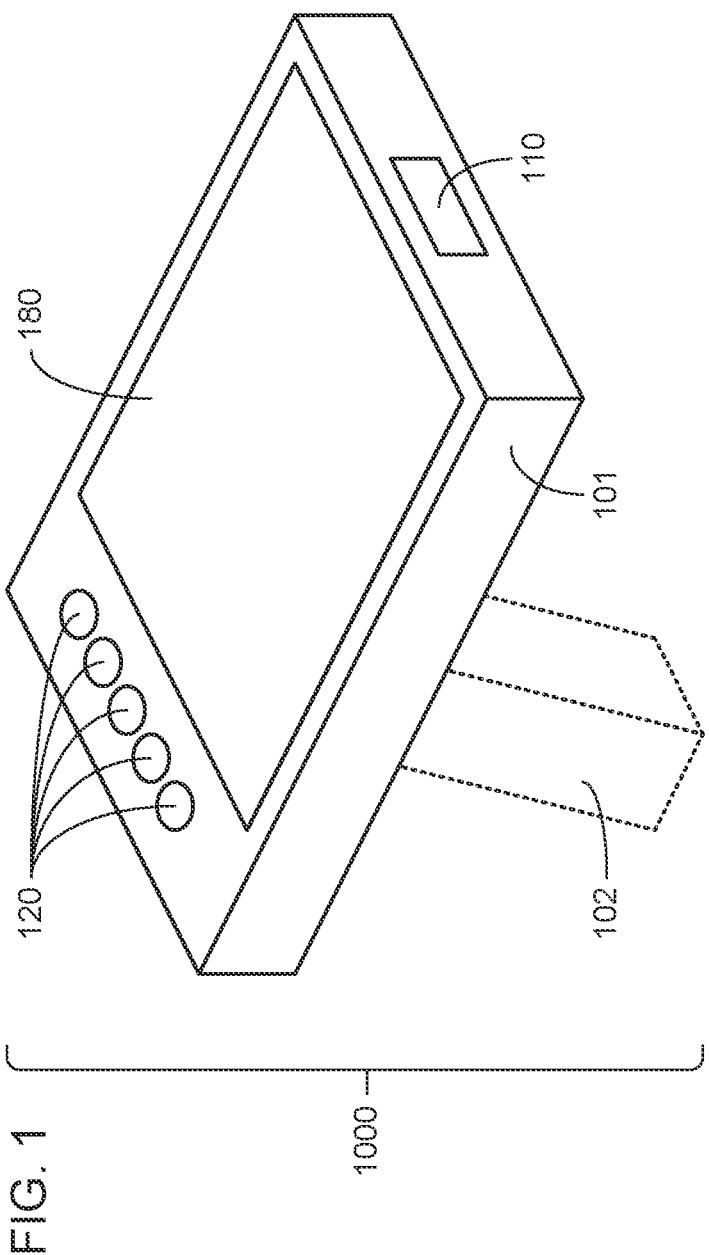
FIG. 1 is a perspective view of a portable electronic device capable of scanning and decoding encoded data markers.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein is a decoding system implementing a method for making efficient use of processing resources in the automated identification and quantification of types of barcode read.

A decoding device includes: a display configured to visually present display images; a display buffer configured to store a current display image that is currently visually presented on the display as display image data; a scanning engine configured to capture scanning images of surfaces of objects; and storage configured to store at least one of the scanning images as captured image data, and an application routine configured to accept data decoded from barcodes as input. The decoding device also includes a processor communicatively coupled to the display buffer and the scanning engine, the processor configured to perform operations including: decode first barcodes carried on the surfaces of objects of the scanning images to retrieve first data encoded within the first barcodes; and provide the first data to the application routine as input. The processor is also configured to, in response to a performance of a screen capture of the current display image from the display buffer, perform operations including: disrupt the decoding of the first barcodes carried on the surfaces of objects of the scanning images; decode a second barcode within the current display image to retrieve second data encoded within the second barcode; and provide the second data to the application routine as input.

A method includes: visually presenting, by a processor of a decoding device, display images on a display of the decoding device; storing a current display image that is currently visually presented on the display as display image data; operating, by the processor, a scanning engine of the decoding device to capture scanning images of surfaces of objects; storing at least one of the scanning images as captured image data, and an application routine configured to accept data decoded from barcodes as input; decoding, by the processor, first barcodes carried on the surfaces of objects of the scanning images to retrieve first data encoded within the first barcodes; and providing the first data to the application routine as input. The method also includes, in response to a performance of a screen capture of the current display image from the display buffer, performing operations including: disrupting the decoding of the first barcodes carried on the surfaces of objects of the scanning images; decoding, by the processor, a second barcode within the current display image to retrieve second data encoded within the second barcode; and providing the second data to the application routine as input.

Figure 2:
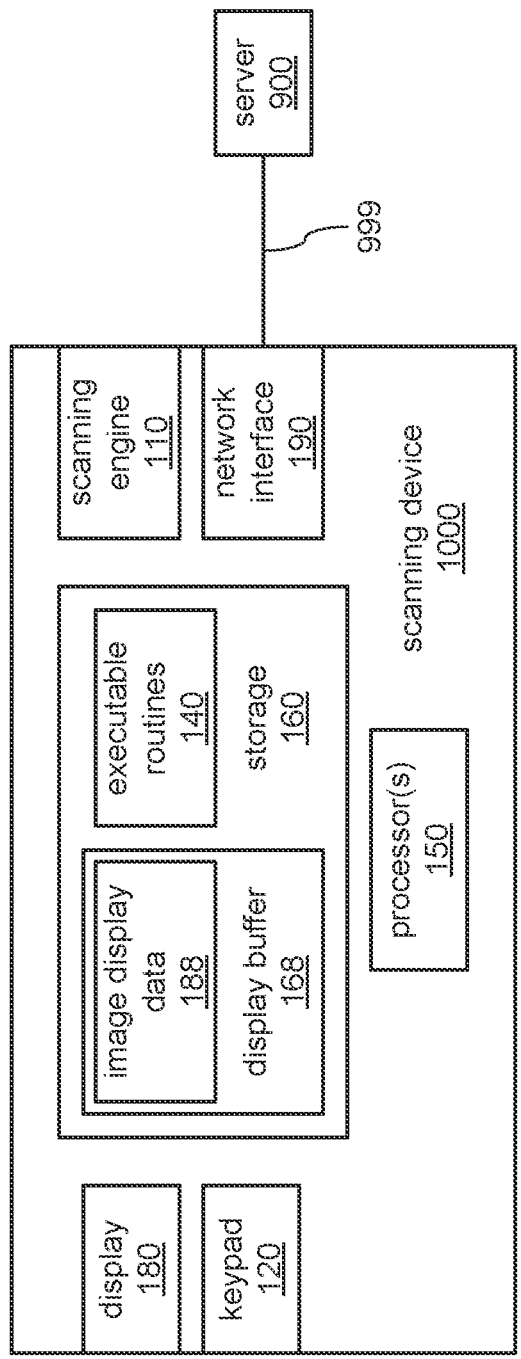
FIG. 2 is a block diagram of hardware components of the portable electronic device of FIG. 1.

FIGS. 1 and 2, taken together, depict aspects of a portable scanning device 1000 that may include a scanning engine 110, one or more processors 150, a storage 160, a keypad 120, a display 180 and/or a network interface 190.

Turning more specifically to FIG. 1, the portable scanning device 1000 may include a casing that is shaped to give the portable device 1000 a generally "pistol-like" physical configuration that includes a generally elongate head portion 101 and a generally elongate grip portion 102. As depicted, an upper end of the grip portion 102 may formed integrally with the head portion 101 at an angle and at a location along the length of the head portion 101 that serves to create the pistol-like physical configuration. In some embodiments, it may be that the grip portion 102 is implemented as an optional attachment that may be removably connectable to the head portion 101. In some of such embodiments, the head portion 101 may be implemented as a fully complete portable computing device having a configuration very much like what has become commonplace in the physical configuration of typical "smart phones" in which the display 180 may make up much of one of the larger surfaces thereof. Further, it should be noted that the display 180 may be a touchscreen, which may obviate the need for the separate and distinct input devices 120 that are depicted.

Turning to FIG. 2, in addition to FIG. 1, the scanning engine 110, the storage 160, the keypad 120, the display 180 and/or the network interface 190 may each be communicatively coupled to the one or more processors 150 to exchange data therewith through the exchange of electrical, optical, magnetic and/or other signals through one or more buses and/or other form of interconnect. Each of the one or more processors 150 may be based on any of a wide variety of architectures supporting of a wide variety of instruction sets. In some embodiments, each of the one or more processors 150 may incorporate, or be otherwise accompanied by, a direct memory access (DMA) component (not specifically shown) that may be more capable of more efficiently transferring data representing images into and/or out of the storage 160. The storage 160 may store one or more executable routines 140, and/or may have a portion thereof allocated to serve as a display buffer 168 within which images currently being visually presented on the display 180 may be stored.

As will be explained in greater detail, each of the executable components 140 may incorporate a sequence of instructions operative on the one or more processors 150 to implement logic to perform various functions. As will also be explained in greater detail, within the scanning device 1000, various ones of the executable components 140 may cooperate to define both a decoding pipeline and a display pipeline. In the display pipeline, images generated entirely within the portable scanning device 1000 and/or images received by the portable scanning device 1000 from other devices (e.g., the depicted example server 990 via the network 999) are visually presented on the display 180. In the decoding pipeline, decoding is performed on images that are captured by the scanning engine 110 of encoded data markings carried on surface(s) of objects, such as one-dimensional indicia (e.g., barcodes), two-dimensional indicia (e.g., QR codes), digital watermarks and/or human-readable text. Following such decoding, the decoded data may be transmitted to another device (e.g., the depicted example server 900 via the network 999).

The scanning engine 110 may be based on any of a variety of technologies and may employ any of a variety of optical scanning and/or other image capturing techniques to capture image(s) of encoded data markings (e.g., indicia, digital watermarks and/or text) carried by a portion of an object. More specifically, the scanning engine 110 may include any of a variety of light sensing components to effect the capture of an image that may include encoded data markings, including and not limited to, a charge-coupled device (CCD) or complementary metal-oxide-semiconductor (CMOS) sensor providing a single row of individual light sensors operated in a manner that sweeps over encoded data markings to perform a scan thereof, or a CCD or CMOS sensor providing a two-dimensional (2D) array of individual light sensors to capture a 2D image of one or more encoded data markings.

In some embodiments, the scanning engine 110 may additionally incorporate, or be otherwise accompanied by, any of a variety of optical components (e.g., lenses, mirrors, color-adjusting gels, etc.—not specifically shown) that may manipulate the light arriving at the scanning engine 110 from within the FOV of the scanning engine 110 in any of a variety of ways before it reaches the light sensing components of the scanning engine 110. Alternatively or additionally, the scanning engine 110 may additionally incorporate, or be otherwise accompanied by, any of a variety of illumination components (e.g., broad spectrum light sources, single frequency light sources, collimated light sources, etc.—not specifically shown) that may serve to illuminate a surface of an object within the FOV in a manner that enhances the ability of the scanning engine 110 to capture an image of a portion of that surface of that object.

The objects on which the encoded data markings are carried may each be any of a variety of objects, including and not limited to, a package carrying a shipping label that includes encoded data marking(s), or a product for sale within retail packaging on which encoded data marking(s) are printed as part of the graphical artwork thereof. The data encoded within such encoded data markings may include, and not be limited to, data indicating the addresses of a sender and/or intended recipient of a package, or data providing a universal product code (UPC) that uniquely identifies a product for sale. Each encoded data marking that is implemented as an indicia may be any of a variety of forms of 1D optically readable indicia (e.g., a barcode) or 2D optically readable indicia (e.g., a QR code), including and not limited to, one or more of Codabar; Code 25 (Interleaved); Code 25 (Non-interleaved); Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; PostBar; POSTNET; RM4SCC/KIX; Telepen; UPC; Aztec Code; Code 1; ColorCode; Color Construct Code; CrontoSign; CyberCode; d-touch; DataGlyphs; Data Matrix; Datastrip Code; digital paper; EZcode; Color; High Capacity Color Barcode; HueCode; InterCode; MaxiCode; MMCC; NexCode; Nintendo e-Reader; Dotcode; PDF417; QR code; ShotCode; and SPARQCode.

The storage 160 may be based on any of a variety of volatile storage technologies, including and are not limited to, random-access memory (RAM), dynamic RAM (DRAM), Double-Data-Rate DRAM (DDR-DRAM), synchronous DRAM (SDRAM), static RAM (SRAM), etc. Alternatively or additionally, the storage 160 may be based on any of a variety of non-volatile storage technologies.

Each of the one or more processors 150 may include any of a wide variety of processors, microcontrollers, gate-array logic devices, etc. that may be incorporate any of a variety of features to enhance speed and/or efficiency of processing operations. Such features may include and are not limited to, multi-threading support per core component, multiple processing core components, directly integrated memory control functionality, and/or various modes of operation by which speed of throughput and/or level of power consumption may be dynamically altered.

Each of the one or more processors 150 may be implemented as a single semiconductor die within a single package. Alternatively, each processor 150 may be implemented as multiple semiconductor dies incorporated into a single package, such as a multi-chip semiconductor package (e.g., a system-on-a-chip, or SOC) in which the multiple semiconductor dies may be interconnected in any of a variety of ways, including and not limited to, conductive wires extending between adjacent semiconductor dies, and/or a substrate formed from multiple layers of conductors separated by intervening layers of insulating material (e.g., a printed circuit board, or PCB) onto which the multiple semiconductor dies may be soldered.

Each of the one or more processors 150 may incorporate one or more core components, one or more graphics processing unit (GPU) components, and/or one or more single-instruction multiple-data (SIMD) components to provide any of a variety of processing architectures for performing any of a variety of operations. Each of the one or more ore components, the one or more GPU components, and/or the one or more SIMD components may, themselves, employ different processing architectures supporting different portions of instruction sets to perform different operations. By way of example, each of the one or more core components may support a larger and more complex instruction set than the one or more GPU components and the one or more SIMD component, and therefore, may support a wider range of operations with a relatively limited number of operands, which may include a wider range of branching instructions. In contrast, the one or more GPU components and/or the one or more SIMD components may support a smaller and less complex instruction set than the one or more core components, but may support the performance of that narrower range of operations across numerous operands at least partially in parallel. For the one or more GPU components, this may be realized through the at least partially parallel performance of the same operations on many separate pieces of data across numerous GPU cores. For the one or more SIMD components, this may realized with sets of multiple operands supported in side-by-side lanes of a set of SIMD registers. However, the one or more GPU components, and the one or more the SIMD components may not support branching instructions. As a result, in executing instructions, the operation and use of the one or more GPU components and/or of the one or more SIMD component may be controlled by the one or more core components.

The network interface 190 may employ any of a variety of wireless communications technologies, including and not limited to, radio frequency transmission, transmission incorporated into electromagnetic fields by which electric power may be wirelessly conveyed, and/or any of a variety of types of optical transmission. Additionally, the network interface 190 may be configured to engage in communications that adhere in timings, protocol and/or in other aspects to one or more known and widely used standards, including and not limited to IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1× RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 3:
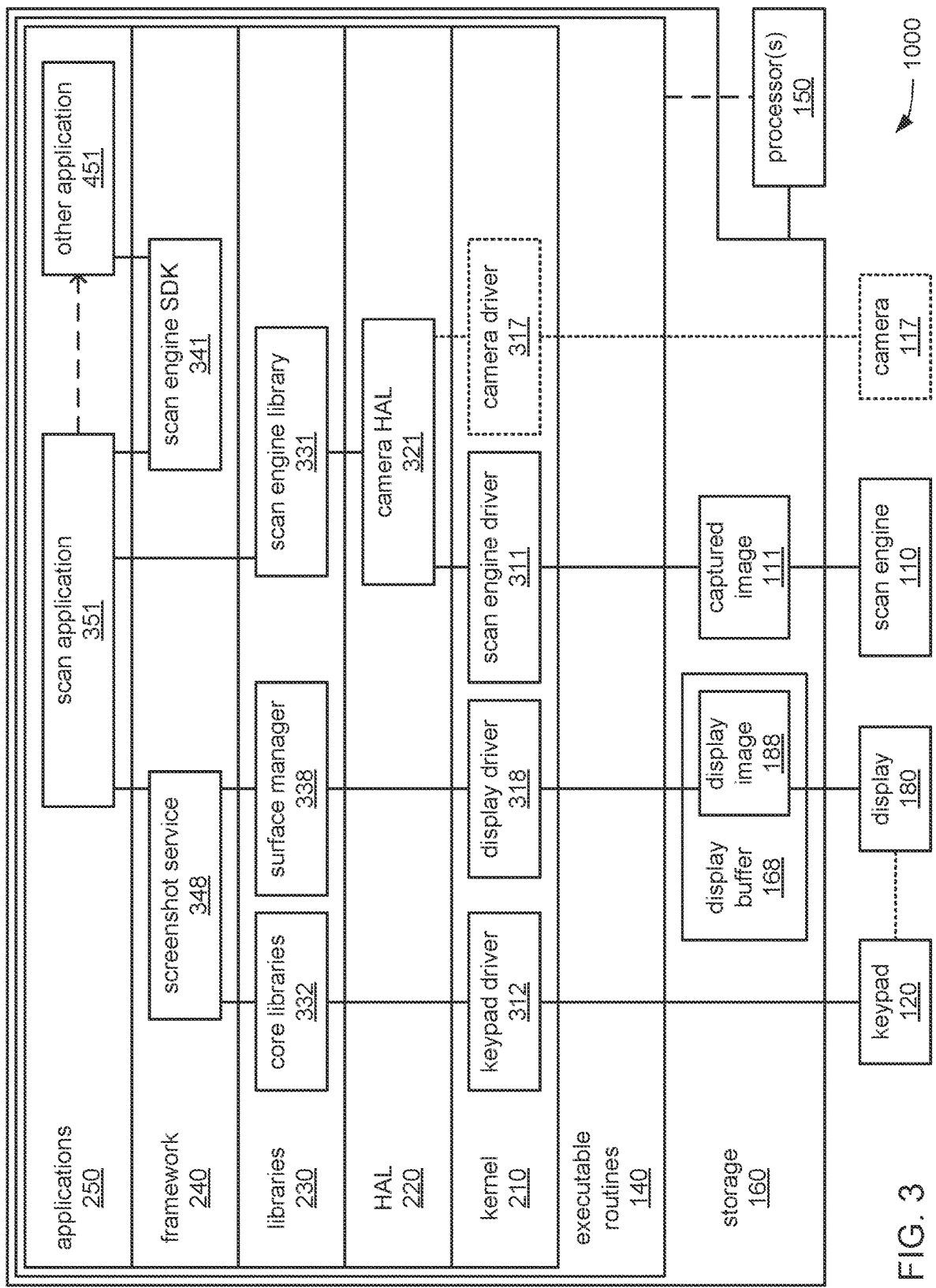
FIG. 3 is a block diagram of an internal architecture of an operating system and related software components of the portable electronic device of FIG. 1 that incorporates an improved decoding pipeline.
Figure 4:
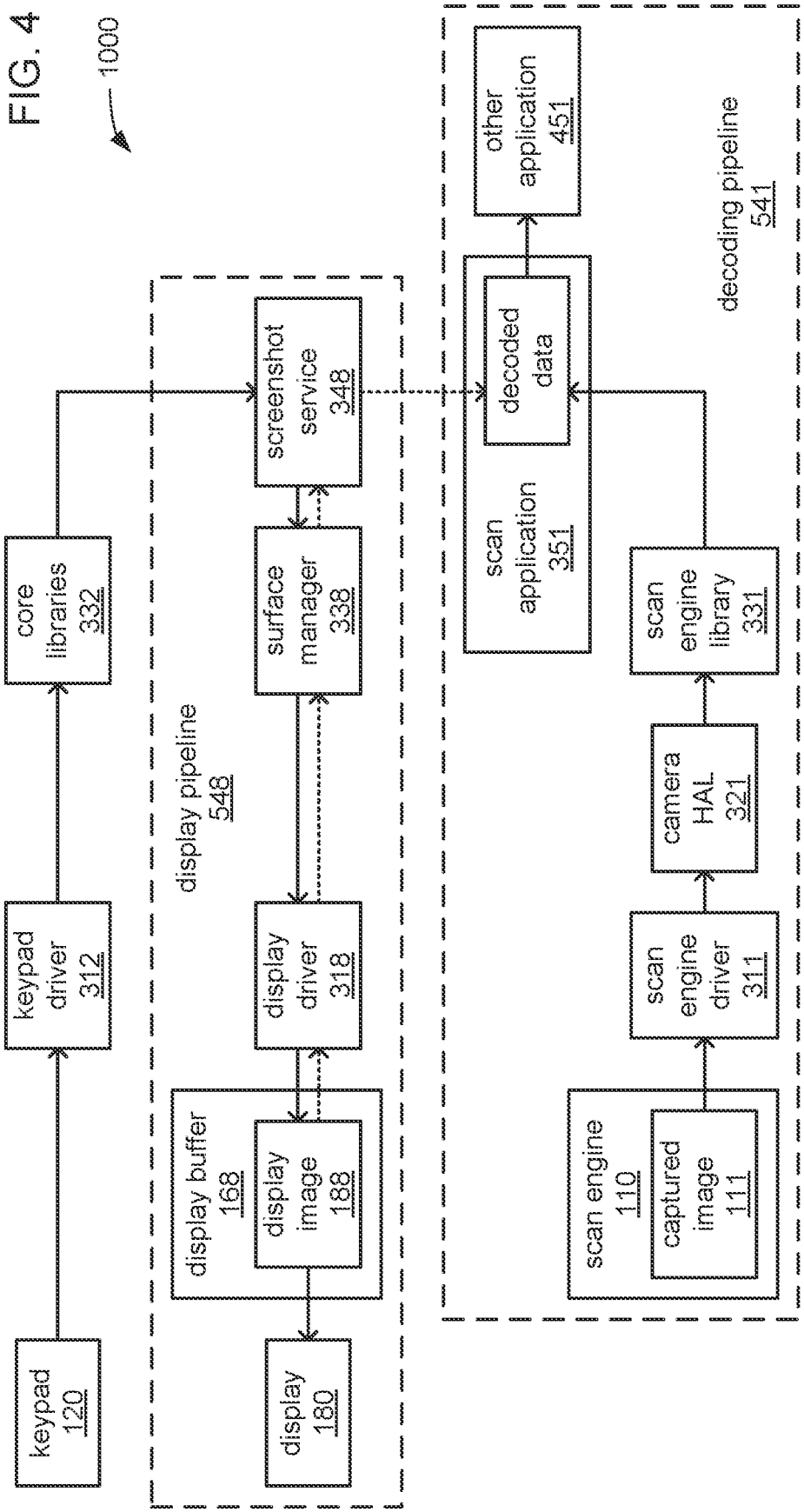
FIG. 4 is a block diagram of the improved decoding pipeline of FIG. 3.

FIGS. 3 and 4, taken together, depict aspects of the Android operating system currently in wide use across many portable electronic devices (e.g., the portable scanning device 1000), along with various modifications made thereto to enable decoding of encoded data markings in images being visually presented on the display 180.

FIG. 3 depicts aspects of the internal architecture of the Android operating system, and the manner in which the executable routines 140 interact with each other and with various hardware components of the portable scanning device 1000. As will be familiar to those skilled in the art, like many other operating systems, in the Android operating system, the executable routines 140 are organized into various layers that span from a lowest layer of the kernel 210 that is in more direct communication with hardware components to a highest layer of applications 250 that has little (if any) contact with hardware components.

The kernel 210 includes various drivers among the executable routines 140 that each provide a lower level of abstraction in interfacing between hardware components and other lower level and/or middle level ones of the executable routines 140. Each driver may be written to interact with a specific model or family of models of hardware components. As depicted, such drivers may include a keypad driver 312 to control and monitor for manual inputs entered via the keypad 120 (and/or via the touchscreen functionality of the display 180 in embodiments that include such functionality); a display driver 318 to control the visual presentation of images on the display 180; a scan engine driver 311 to control the use of the scanning engine 110 in capturing images of encoded data markings carried on surfaces of objects; and/or a camera driver 317 to control the operation of a more conventional camera 117 (in embodiments that include one) in performing more conventional captures of images of scenery that may have nothing to do with encoded data markings on surfaces of objects.

The hardware abstraction layer (HAL) 220 includes ones of the executable routines 140 that may each communicate with one or more drivers in the kernel 210 that are associated with one or more particular hardware components that fall within a particular category of hardware components, and that may each provide a single unified interface for that particular category as a layer of abstraction for other middle level ones of the executable routines 140. In various embodiments each such interface that is so provided may be configured to conform to a particular widely used industry standard interface for the corresponding particular category of hardware components. In this way, and in cooperation with the device drivers of the kernel 210, developers of routines at higher levels are provided with a consistent interface that enables access to hardware components of one or more particular categories in a manner that changes little (if at all) despite changes that may be made to the hardware components, themselves. As depicted, the HAL 220 may include at least a camera HAL 321 that provides a single consistent interface to higher level ones of the executable routines 140 for controlling cameras, where that interface changes little (if at all) despite whatever combination of the scanning engine 110, the camera 117 and/or still other hardware components that may be present for capturing images of scenery and/or objects therein.

The libraries 230 includes ones of the executable routines 140 that may each provide callable function routines associated with a particular range of commonly used functions. Some of those ranges of commonly used functions may be associated with a particular category of hardware component such that the callable functions thereof are meant to interact with hardware components of a particular category through executable routine(s) 140 at the layer of the HAL 220 and/or through driver(s) at the layer of the kernel 210. As depicted, the libraries 230 may include core libraries 332 to provide callable function routines that perform such commonly used functions as retrieving manually entered input from the keypad 120 and/or other manually-operable input devices; a surface manager 338 to provide callable function routines that perform such commonly used functions as storing portions of an image within the display buffer 168 to cause that image to be visually presented on the display 180; and/or a scan engine library 331 to provide callable function routine that perform such commonly used functions as capture an image of a surface that may carry an encoded data marker.

The framework 240 includes ones of the executable routines 140 that may each provide still higher level callable functions associated with a larger range of functionality. In some embodiments executable routines 140 at the level of the framework 240 may provide sets of object classes with callable methods. As depicted, the framework 240 may include a screenshot service 348 that may include higher level callable functions to cause the capture of an image and/or to cause the monitoring for manual input indicative of a command to capture an image (e.g., a single button press); and/or a scan engine SDK 341 that may include higher level callable functions to cause the performance of a decoding of encoded data marker.

The applications 250 includes ones of the executable routines 140 that may be the actual application routines that a user of the portable scanning device 1000 may more directly interact with. As depicted, the applications 250 may include a scan application 251 that may provide a user the ability to control aspects of scanning surfaces that may carry encoded data markers and/or to control aspects of decoding encoded data markers that may be present in images.

FIG. 4 depicts aspects of the manner in which sets of the executable routines 140 may be cooperate to define at least a decoding pipeline 541 and a display pipeline 548.

Regarding the display pipeline 548, as previously discussed, the display driver 318 may be matched to one or more particular hardware components (not specifically shown) that retrieve a display image 188 from image display data stored within the display buffer 168, and drive the display 180 to visually present that display image 188. The surface manager 338 may provide a mid-level programming interface based on callable routines that various higher-level ones of the executable routines 140 at the level of the framework 240 or the applications 250 may directly (or indirectly through callable function routines) use to cause the storage of newer ones of the display image 188 to be stored in the display buffer 168 for visual presentation on the display 180. The screenshot service 348 may be a higher level one of the executable routines 140 that provides higher level callable function routines for capturing a current one of the display image 188 from within the frame buffer 168.

Similarly, the keypad driver 312 may be matched to the particular model of the keypad 120 to receive touch input from touch-sensing hardware co-located with the display 180, and/or from still other hardware components that receive manual input from a user. The core libraries 332 may provide a mid-level programming interface based on callable routines that various executable routines 140 at the level of the framework 240 or the applications 250 may use to receive and interpret manual input to identify the entry of data and/or commands by a user.

Regarding the decoding pipeline 541, as previously discussed, the scan engine driver 311 may be matched to the scanning engine 310 to enable operation of the scanning engine 110 to capture an image (i.e., the captured image 111) of what may be a surface of an object that may carry an encoded data marker thereon. The camera HAL 321 may provide a mid-level interface by which any of a variety of different image capturing hardware may be operated. The scan engine library 331 may provide a somewhat higher mid-level programming interface based on callable routines that various higher-level ones of the executable routines 140 at the level of the framework 240 or the applications 250 may directly (or indirectly through callable function routines) use to the capturing of newer ones of the captured image 111, and/or decoding encoded data markers that may be present in various ones of the captured image 111. The scan application 351 may provide a user of the portable scanning device 1000 a user interface by which operation of the portable scanning device 1000 either to perform a scan of a surface of an object within the field of view of the scanning engine 110 followed by a decoding of an encoded data marker that may be within the resulting captured image 111, or to perform a capture of the current display image 188 from the display buffer 168 followed by a decoded of an encoded data marker that may be in the current display image 188.

As depicted, it may be that the decoding pipeline 541 is extensible to include one or more other applications 451 that may be provided with at least an indication of the data that was encoded within an encoded data marker, but which has now been decoded under the control of the scan application 351.

In some embodiments, the scan application 351 may be a modified form of a pre-existing version of the scan application 351. The modified form may be so modified to add the ability to call function routines (or otherwise communicate with) the screenshot service to trigger the obtaining of the current display image 168 therefrom. In some embodiments, it may be that the set of executable routines 140 must be modified to replace the pre-existing version of the scan application 351 with such a modified form thereof. In this way, the decoding pipeline may be altered to insert a capability to accept an alternate input originating from the display pipeline 548 such that the current display image 168 is able to be caused to be decoded in lieu of decoding one(s) of the captured image 111.

Figure 5:
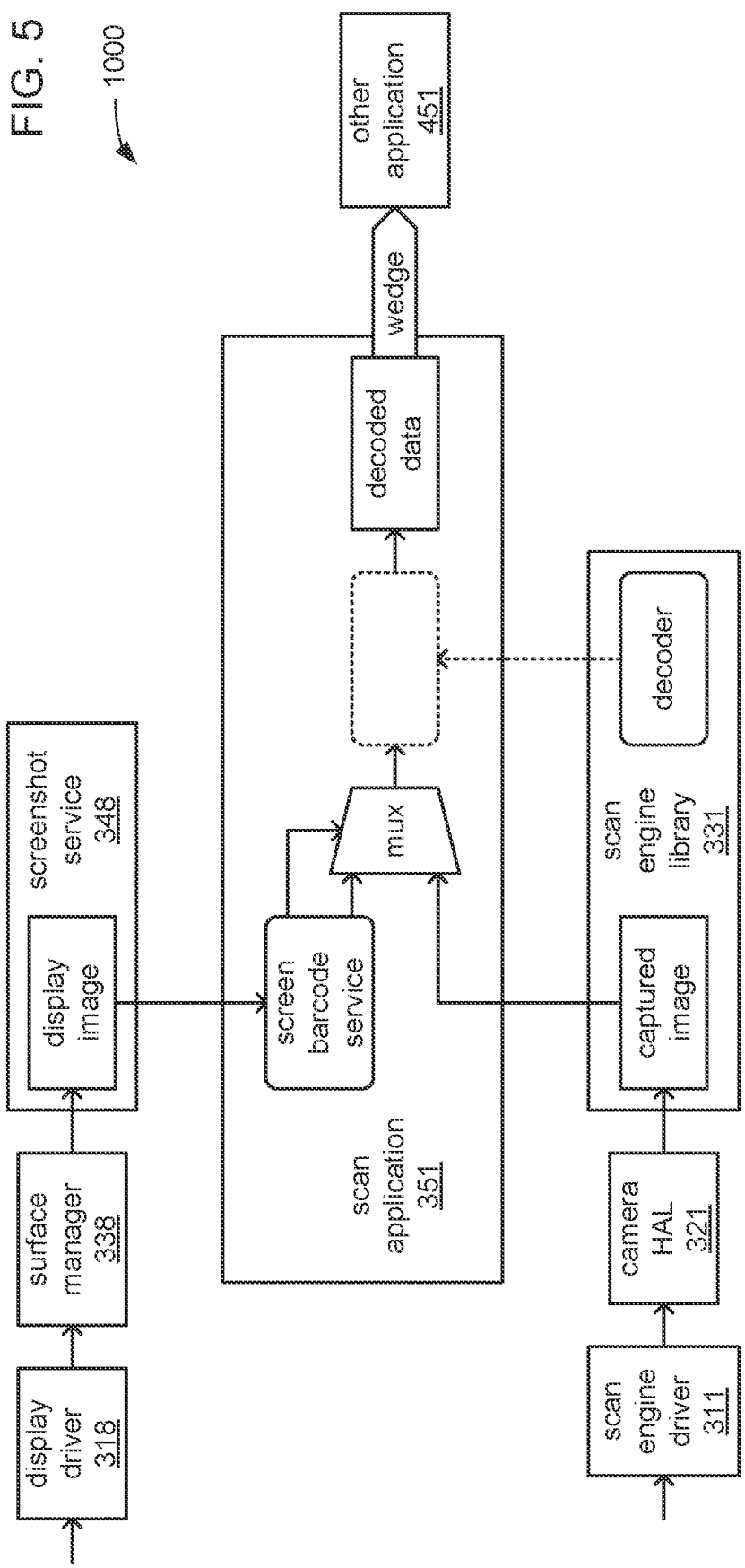
FIG. 5 is a block diagram, in greater detail, of an inserted software component of the improved decoding pipeline of FIG. 4.

FIG. 5 depicts aspects of the manner in which such a modified form of the scan application 351 may provide such a point of insertion of such an input into the decoding pipeline 541. Such a modified form of the scan application 351 may include a multiplexer switchable between receiving either a display image from the display pipeline 548 or a captured image from the decoding pipeline 541. In some embodiments, the insertion of such another input into the decoding pipeline 541 may require a registration of the multiplexer (or more specifically, its input) with the screen shot service 348 to receive the display image as an output therefrom.

In some embodiments, as a measure against the possibility of effectively unintentionally disable all scanning and/or decoding of encoded data markers using the scanning device 1000, the multiplexer may be configured to default to pass through the captured image that was captured using the scanning engine 110. It may be that such a registration process may fail such that the ability to insert a current display image captured from the display buffer 168 is not enabled. In such a situation, the default of the multiplexer to pass through captured images that are captured using the scanning engine 110 may serve to ensure that at least such functionality for scanning and decoding encoded data markers carried on surfaces of objects is not impaired. This measure may be taken based on the ability to accept display images from the display buffer 168 being deemed a "nice-to-have" feature, while the ability to still properly use the scanning engine 110 (the inclusion of which may have made the portable scanning device 1000 more costly) is deemed to be an "essential" feature.

As also depicted, in some embodiments, the decoding of the image that is passed through the multiplexer (regardless of whether it is a display image or a captured image) may be performed by a decoder that is implemented as a callable function routine in the scan engine library 331.

Regardless of exactly which one of the executable routines 140 includes the executable instructions that implement the decoder, in some embodiments, the decoder may be configurable to output the data that is retrieved through such decoding (i.e., the decoded data) in a format and/or with a protocol that enables its acceptance as input to other applications 451 as if it were input received from the keypad 120 or another manually-operable input component. Such an approach may be deemed necessary where such other application(s) 451 may not be capable of accepting the decoded data in its original form, which may include the use of a format unique to barcodes, QR codes, and/or other forms of encoded data markings. To enable such acceptance of input by other application(s) 451, it may be that the scan application 351 is configured to allow the other application(s) 451 to be registered with the scan application 351 to accept such output of the decoder as input to the other application(s) 451.

Figure 6:
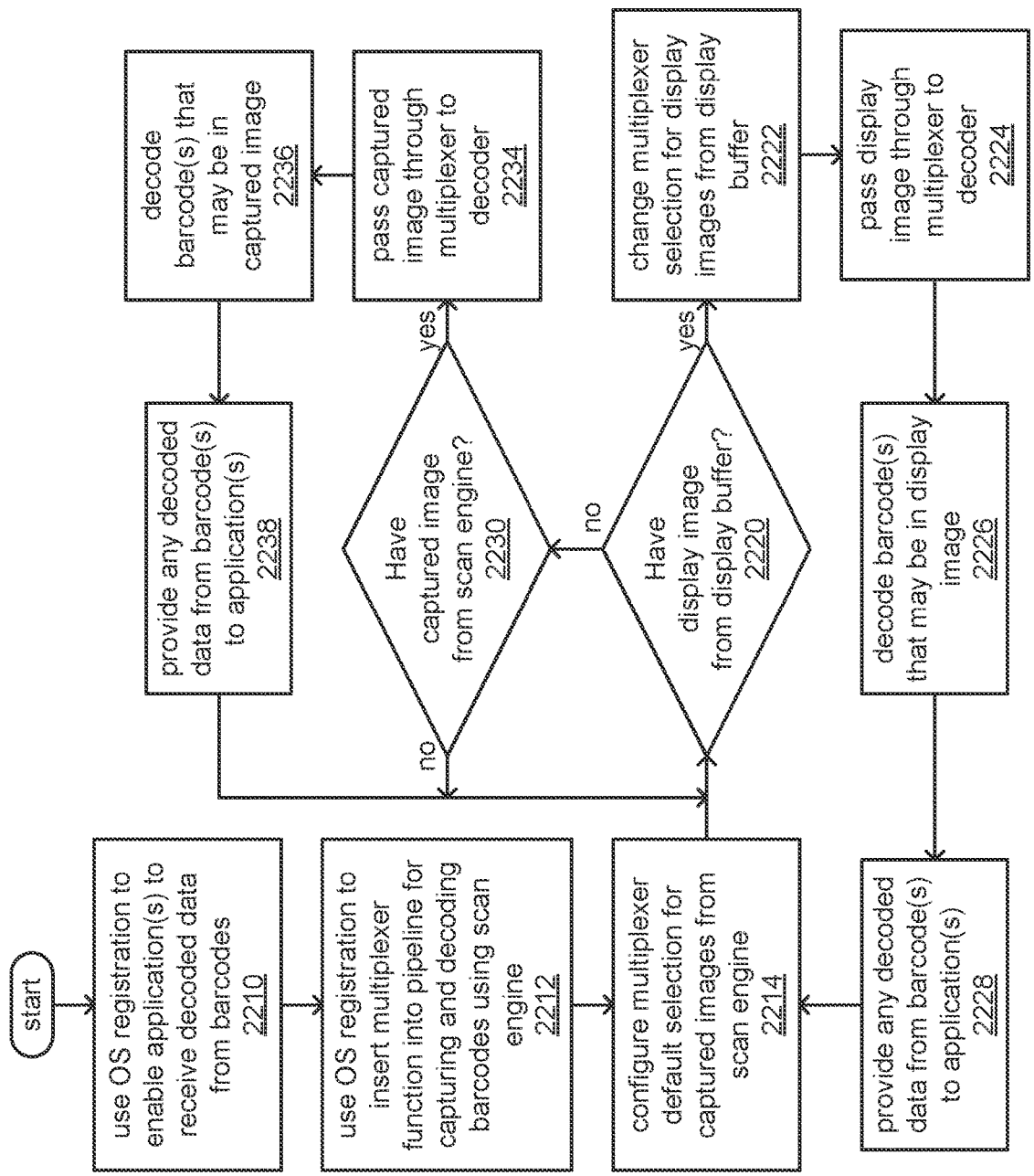
FIG. 6 is a flowchart of operation of the improved decoding pipeline of FIG. 4.

FIG. 6 depicts a flow chart of a manner of preparation and use of the portable scanning device 1000.

At 2210, processor(s) of a portable scanning device may be caused by the execution of components of an operating system of the portable scanning device to perform a registration procedure to enable one or more application routines to receive decoded data output by a decoder of encoded data markings as input. At 2212, the processor(s) may be similarly caused to perform another registration procedure as part of inserting a multiplexer within a scan application into a decoding pipeline (e.g., a pipeline for the decoding of encoded data markers that may be present in images captured using a scanning engine of the scanning device). As has been discussed, in this way, the decoding pipeline may be caused to become capable of also receiving a current display image that is a copy of what is currently being visually presented on a display of the scanning device.

At 2214, the multiplexer may be configured to, by default, pass through captured images from the scan engine to a decoder of the decoding pipeline. Again, this may be a fail-safe feature that serves to ensure that at least the decoding of encoded data markings in captured images from the scanning engine remains possible, even if the attempt to enable the acceptance of display images through the registration at 2210 fails.

At 2220, the processor(s) may perform a check of whether there is a display image captured from the display buffer of the scanning device that is being made available at the alternate input added to the decoding pipeline through the insertion of the multiplexer. If there is, then at 2222, the multiplexer selection of inputs may be changed to that inserted alternated input, and then that display image may be passed through the multiplexer to the decoder at 2224. At 2226, the processor(s) may be caused to decode any encoded data marking that may be present within the display image to retrieve the data that may be encoded therein. At 2228, any data that was successfully decoded from at least one encoded data marking within that display image may be provided to one or more of the other application routines that are registered to receive it as an input. Again, it may be that the provision of such decoded data may be performed in a manner that causes it to resemble manually-entered input from a keypad, etc., being provided to at the input of each of the one or more of the other application routines. At 2214, the multiplexer may be again reset to cause the passing through of captured images from the scanning engine to be its default.

However, if the check made at 2220 reveals no display image captured from the display buffer being presented at the alternate input of the multiplexer, then at 2230, the processor(s0 may perform a check of whether is a new captured image being provided from the scanning engine. If there is, then at 2234, the multiplexer may pass through the new captured image to the decoder as a result of its default setting to do so. At 2236, the processor(s) may be caused to decode any encoded data marking that may be present within the new captured image to retrieve the data that may be encoded therein. At 2238, any data that was successfully decoded from at least one encoded data marking within that captured image may be provided to one or more of the other application routines that are registered to receive it as an input. The check at 2220 may then be repeated.

There is thus disclosed a decoding device that enables the capture of an image currently visually presented on its display, directly from its display buffer, for having an encoded data marking that may be present therein directly decoded therein.

A decoding device includes: a display configured to visually present display images; a display buffer configured to store a current display image that is currently visually presented on the display as display image data; a scanning engine configured to capture scanning images of surfaces of objects; and storage configured to store at least one of the scanning images as captured image data, and an application routine configured to accept data decoded from barcodes as input. The decoding device also includes a processor communicatively coupled to the display buffer and the scanning engine, the processor configured to perform operations including: decode first barcodes carried on the surfaces of objects of the scanning images to retrieve first data encoded within the first barcodes; and provide the first data to the application routine as input. The processor is also configured to, in response to a performance of a screen capture of the current display image from the display buffer, perform operations including: disrupt the decoding of the first barcodes carried on the surfaces of objects of the scanning images; decode a second barcode within the current display image to retrieve second data encoded within the second barcode; and provide the second data to the application routine as input.

The storage may be further configured to store a set of decoding routines executable by the processor, and configured to cooperate to form a decoding pipeline in which the processor is caused to perform the decoding of the first barcodes; the decoding pipeline may extend from the scanning engine at an input end of the decoding pipeline to the application routine at an output end of the decoding pipeline; and the processor may be further configured to insert another routine that implements a multiplexer into the decoding pipeline to enable the disruption of the decoding of the first barcodes and to enable the decoding of the second barcode.

The processor may be further configured to provide the first data and the second data to the application routine as simulated keyboard input at the output end of the pipeline.

To enable an input of the multiplexer to receive the current display image, the processor may be further configured to register a component of the multiplexer with an operating system of the decoding device.

The decoding device may further include an input device, wherein the processor may be further configured to: monitor the input device for receipt of an indication of manual operation of the input device to trigger the performance of the screen capture of the current display image; and in response to the receipt of the indication, perform the screen capture of the current display image from the display buffer.

The processor may be further configured to: repeat the performance of the screen capture of the current display image on a recurring interval of time to cause a decoding of a new instance of the second barcode within the current display image to generate a new instance of the second data in each interval; analyze successively generated new instances of the second data to identify at least one duplicate instance of the second data; and filter the at least one duplicate instance of the second data from the successively generated new instances of the second data before providing the successively generated new instances of the second data to the application routine as input.

The processor may be further configured to: monitor the display buffer to detect a change in the current display image; repeat the performance of the screen capture of the current display image in response to each instance of detecting a change in the current display image to cause a decoding of a new instance of the second barcode within the current display image to generate a new instance of the second data; analyze successively generated new instances of the second data to identify at least one duplicate instance of the second data; and filter the at least one duplicate instance of the second data from the successively generated new instances of the second data before providing the successively generated new instances of the second data to the application routine as input.

To enable provision of the first data and the second data to the application routine, the processor may be further configured to accept registration of the application routine with a scan engine library that provides a decoding routine for the decoding of barcodes.

The decoding device may further include an input device, wherein the storage may be further configured to store a set of stored images and the processor may be further configured to: operate the display and the input device to provide a user interface by which a user of the decoding device is able to view individual stored images of the set of stored images on the display; and repeat the performance of the screen capture of the current display image in response to each instances of detecting a change that arises from a change of which stored image of the set of stored images is currently visually presented on the display.

The second barcode may be received at the decoding device in network communications from another device; and the screen capture of the current display image from the display buffer may occur while contents of the network communications are visually presented on the display.

A method includes: visually presenting, by a processor of a decoding device, display images on a display of the decoding device; storing a current display image that is currently visually presented on the display as display image data; operating, by the processor, a scanning engine of the decoding device to capture scanning images of surfaces of objects; storing at least one of the scanning images as captured image data, and an application routine configured to accept data decoded from barcodes as input; decoding, by the processor, first barcodes carried on the surfaces of objects of the scanning images to retrieve first data encoded within the first barcodes; and providing the first data to the application routine as input. The method also includes, in response to a performance of a screen capture of the current display image from the display buffer, performing operations including: disrupting the decoding of the first barcodes carried on the surfaces of objects of the scanning images; decoding, by the processor, a second barcode within the current display image to retrieve second data encoded within the second barcode; and providing the second data to the application routine as input.

The method may further include: executing, by the processor, a set of decoding routines that are configured to cooperate to form a decoding pipeline by which the decoding of the first barcodes is performed, wherein the decoding pipeline extends from the scanning engine at an input end of the decoding pipeline to the application routine at an output end of the decoding pipeline; and inserting another routine that implements a multiplexer into the decoding pipeline to enable the disruption of the decoding of the first barcodes and to enable the decoding of the second barcode.

The method may further include providing the first data and the second data to the application routine as simulated keyboard input at the output end of the pipeline.

The method may further include registering a component of the multiplexer with an operating system of the decoding device to enable an input of the multiplexer to receive the current display image following the performance of the screen capture of the current display image.

The method may further include: monitoring an input device of the decoding device for receipt of an indication of manual operation of the input device to trigger the performance of the screen capture of the current display image; and in response to the receipt of the indication, performing, by the processor, the screen capture of the current display image from the display buffer.

The method may further include: repeating, by the processor, the performance of the screen capture of the current display image on a recurring interval of time to cause a decoding of a new instance of the second barcode within the current display image to generate a new instance of the second data in each interval; analyzing, by the processor, successively generated new instances of the second data to identify at least one duplicate instance of the second data; and filtering, by the processor, the at least one duplicate instance of the second data from the successively generated new instances of the second data before providing the successively generated new instances of the second data to the application routine as input.

The method may further include: monitoring the display buffer to detect a change in the current display image; repeating, by the processor, the performance of the screen capture of the current display image in response to each instance of detecting a change in the current display image to cause a decoding of a new instance of the second barcode within the current display image to generate a new instance of the second data; analyzing, by the processor, successively generated new instances of the second data to identify at least one duplicate instance of the second data; and filtering, by the processor, the at least one duplicate instance of the second data from the successively generated new instances of the second data before providing the successively generated new instances of the second data to the application routine as input.

The method may further include accepting, by the processor, registration of the application routine with a scan engine library that provides a decoding routine for the decoding of barcodes to enable provision of the first data and the second data to the application routine.

The method may further include: operating the display and an input device of the decoding device to provide a user interface by which a user of the decoding device is able to view individual stored images of a set of stored images on the display; and repeating, by the processor, the performance of the screen capture of the current display image in response to each instances of detecting a change that arises from a change of which stored image of the set of stored images is currently visually presented on the display.

The second barcode may be received at the decoding device in network communications from another device; and the screen capture of the current display image from the display buffer may occur while contents of the network communications are visually presented on the display.

The invention claimed is:

1. A decoding device comprising:
   a display configured to visually present display images;
   a display buffer configured to store a current display image that is currently visually presented on the display as display image data;
   a scanning engine configured to capture scanning images of surfaces of objects;
   storage configured to store at least one of the scanning images as captured image data, and an application routine configured to accept data decoded from barcodes as input; and
   a processor communicatively coupled to the display buffer and the scanning engine, the processor configured to perform operations comprising:
      decode first barcodes carried on the surfaces of objects of the scanning images to retrieve first data encoded within the first barcodes;
      provide the first data to the application routine as input; and
      in response to a performance of a screen capture of the current display image from the display buffer, perform operations comprising:
         disrupt the decoding of the first barcodes carried on the surfaces of objects of the scanning images;
         decode a second barcode within the current display image to retrieve second data encoded within the second barcode; and
         provide the second data to the application routine as input,
   wherein:
      the storage is further configured to store a set of decoding routines executable by the processor, and configured to cooperate to form a decoding pipeline in which the processor is caused to perform the decoding of the first barcodes;
      the decoding pipeline extends from the scanning engine at an input end of the decoding pipeline to the application routine at an output end of the decoding pipeline; and
      the processor is further configured to insert another routine that implements a multiplexer into the decoding pipeline to enable the disruption of the decoding of the first barcodes and to enable the decoding of the second barcode.

2. The decoding device of claim 1, wherein the processor is further configured to provide the first data and the second data to the application routine as simulated keyboard input at the output end of the pipeline.

3. The decoding device of claim 1, wherein to enable an input of the multiplexer to receive the current display image, the processor is further configured to register a component of the multiplexer with an operating system of the decoding device.

4. The decoding device of claim 1, further comprising an input device, wherein the processor is further configured to:
   monitor the input device for receipt of an indication of manual operation of the input device to trigger the performance of the screen capture of the current display image; and
   in response to the receipt of the indication, perform the screen capture of the current display image from the display buffer.

5. The decoding device of claim 1, wherein the processor is further configured to:
   monitor the display buffer to detect a change in the current display image;
   repeat the performance of the screen capture of the current display image in response to each instance of detecting a change in the current display image to cause a decoding of a new instance of the second barcode within the current display image to generate a new instance of the second data;
   analyze successively generated new instances of the second data to identify at least one duplicate instance of the second data; and
   filter the at least one duplicate instance of the second data from the successively generated new instances of the second data before providing the successively generated new instances of the second data to the application routine as input.

6. The decoding device of claim 1, wherein, to enable provision of the first data and the second data to the application routine, the processor is further configured to accept registration of the application routine with a scan engine library that provides a decoding routine for the decoding of barcodes.

7. The decoding device of claim 5, further comprising an input device, wherein:
   the storage is further configured to store a set of stored images; and
   the processor is further configured to:
      operate the display and the input device to provide a user interface by which a user of the decoding device is able to view individual stored images of the set of stored images on the display; and
      repeat the performance of the screen capture of the current display image in response to each instances of detecting a change that arises from a change of which stored image of the set of stored images is currently visually presented on the display.

8. The decoding device of claim 1, wherein:
   the second barcode is received at the decoding device in network communications from another device; and
   the screen capture of the current display image from the display buffer occurs while contents of the network communications are visually presented on the display.

9. The decoding device of claim 1, wherein:
   the second barcode is received at the decoding device in network communications from another device; and
   the screen capture of the current display image from the display buffer occurs while contents of the network communications are visually presented on the display.

10. A decoding device comprising:
    a display configured to visually present display images;
    a display buffer configured to store a current display image that is currently visually presented on the display as display image data;
    a scanning engine configured to capture scanning images of surfaces of objects;
    storage configured to store at least one of the scanning images as captured image data, and an application routine configured to accept data decoded from barcodes as input; and
    a processor communicatively coupled to the display buffer and the scanning engine, the processor configured to perform operations comprising:

decode first barcodes carried on the surfaces of objects of the scanning images to retrieve first data encoded within the first barcodes;
provide the first data to the application routine as input;
in response to a performance of a screen capture of the current display image from the display buffer, perform operations comprising:
disrupt the decoding of the first barcodes carried on the surfaces of objects of the scanning images;
decode a second barcode within the current display image to retrieve second data encoded within the second barcode; and
provide the second data to the application routine as input,
repeat the performance of the screen capture of the current display image on a recurring interval of time to cause a decoding of a new instance of the second barcode within the current display image to generate a new instance of the second data in each interval;
analyze successively generated new instances of the second data to identify at least one duplicate instance of the second data; and
filter the at least one duplicate instance of the second data from the successively generated new instances of the second data before providing the successively generated new instances of the second data to the application routine as input.

11. A method comprising:
visually presenting, by a processor of a decoding device, display images on a display of the decoding device;
storing a current display image that is currently visually presented on the display as display image data;
operating, by the processor, a scanning engine of the decoding device to capture scanning images of surfaces of objects;
storing at least one of the scanning images as captured image data, and an application routine configured to accept data decoded from barcodes as input;
decoding, by the processor, first barcodes carried on the surfaces of objects of the scanning images to retrieve first data encoded within the first barcodes;
providing the first data to the application routine as input;
in response to a performance of a screen capture of the current display image from the display buffer, performing operations comprising:
disrupting the decoding of the first barcodes carried on the surfaces of objects of the scanning images;
decoding, by the processor, a second barcode within the current display image to retrieve second data encoded within the second barcode; and
providing the second data to the application routine as input;
executing, by the processor, a set of decoding routines that are configured to cooperate to form a decoding pipeline by which the decoding of the first barcodes is performed, wherein the decoding pipeline extends from the scanning engine at an input end of the decoding pipeline to the application routine at an output end of the decoding pipeline; and
inserting another routine that implements a multiplexer into the decoding pipeline to enable the disruption of the decoding of the first barcodes and to enable the decoding of the second barcode.

12. The method of claim 11, further comprising providing the first data and the second data to the application routine as simulated keyboard input at the output end of the pipeline.

13. The method of claim 11, further comprising registering a component of the multiplexer with an operating system of the decoding device to enable an input of the multiplexer to receive the current display image following the performance of the screen capture of the current display image.

14. The method of claim 11, further comprising:
monitoring an input device of the decoding device for receipt of an indication of manual operation of the input device to trigger the performance of the screen capture of the current display image; and
in response to the receipt of the indication, performing, by the processor, the screen capture of the current display image from the display buffer.

15. The method of claim 11, further comprising:
repeating, by the processor, the performance of the screen capture of the current display image on a recurring interval of time to cause a decoding of a new instance of the second barcode within the current display image to generate a new instance of the second data in each interval;
analyzing, by the processor, successively generated new instances of the second data to identify at least one duplicate instance of the second data; and
filtering, by the processor, the at least one duplicate instance of the second data from the successively generated new instances of the second data before providing the successively generated new instances of the second data to the application routine as input.

16. The method of claim 11, further comprising registering one or more application routines to accept the first data and the second data as output from the decoding.

17. The method of claim 11, wherein the multiplexer passes captured scanning images into a decoder of the decoding pipeline by default.

18. A method comprising:
visually presenting, by a processor of a decoding device, display images on a display of the decoding device;
storing a current display image that is currently visually presented on the display as display image data;
operating, by the processor, a scanning engine of the decoding device to capture scanning images of surfaces of objects;
storing at least one of the scanning images as captured image data, and an application routine configured to accept data decoded from barcodes as input;
decoding, by the processor, first barcodes carried on the surfaces of objects of the scanning images to retrieve first data encoded within the first barcodes;
providing the first data to the application routine as input;
in response to a performance of a screen capture of the current display image from the display buffer, performing operations comprising:
disrupting the decoding of the first barcodes carried on the surfaces of objects of the scanning images;
decoding, by the processor, a second barcode within the current display image to retrieve second data encoded within the second barcode; and
providing the second data to the application routine as input;
monitoring the display buffer to detect a change in the current display image;
repeating, by the processor, the performance of the screen capture of the current display image in response to each instance of detecting a change in the current display image to cause a decoding of a new instance of the second barcode within the current display image to generate a new instance of the second data;

analyzing, by the processor, successively generated new instances of the second data to identify at least one duplicate instance of the second data; and filtering, by the processor, the at least one duplicate instance of the second data from the successively generated new instances of the second data before providing the successively generated new instances of the second data to the application routine as input.

19. The method of claim 18, further comprising accepting, by the processor, registration of the application routine with a scan engine library that provides a decoding routine for the decoding of barcodes to enable provision of the first data and the second data to the application routine.

20. The method of claim 18, further comprising:

operating the display and an input device of the decoding device to provide a user interface by which a user of the decoding device is able to view individual stored images of a set of stored images on the display; and repeating, by the processor, the performance of the screen capture of the current display image in response to each instances of detecting a change that arises from a change of which stored image of the set of stored images is currently visually presented on the display.

\* \* \* \* \*